US011292329B2

(12) United States Patent
Ueki et al.

(10) Patent No.: US 11,292,329 B2
(45) Date of Patent: Apr. 5, 2022

(54) ACTIVE ANTI-VIBRATION DEVICE AND METHOD OF CONTROLLING ACTIVE-VIBRATION DEVICE

(71) Applicant: BRIDGESTONE CORPORATION, Tokyo (JP)

(72) Inventors: Akira Ueki, Kamakura (JP); Masakazu Nagasawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/615,131

(22) PCT Filed: Feb. 13, 2018

(86) PCT No.: PCT/JP2018/004833
§ 371 (c)(1),
(2) Date: Nov. 20, 2019

(87) PCT Pub. No.: WO2018/216268
PCT Pub. Date: Nov. 29, 2018

(65) Prior Publication Data

US 2020/0122561 A1 Apr. 23, 2020

(30) Foreign Application Priority Data

May 23, 2017 (JP) ............................ JP2017-102164

(51) Int. Cl.
*F16F 15/02* (2006.01)
*B60K 5/12* (2006.01)
*F16F 13/26* (2006.01)

(52) U.S. Cl.
CPC .......... *B60K 5/1283* (2013.01); *B60K 5/1208* (2013.01); *F16F 13/26* (2013.01);
(Continued)

(58) Field of Classification Search
CPC ...... B60K 5/1208; B60K 5/1283; B60K 6/48; F16F 13/10; F16F 13/107; F16F 15/02; F16F 15/08
(Continued)

(56) References Cited

U.S. PATENT DOCUMENTS 4,610,420 A * 9/1986 Fukushima ........... F16F 13/262 180/300
8,818,625 B2 * 8/2014 Muragishi ............. F16F 15/002 701/36
(Continued)

FOREIGN PATENT DOCUMENTS

CN 102472359 A 5/2012
CN 103180633 A 6/2013
(Continued)

OTHER PUBLICATIONS

May 15, 2018, International Search Report issued in the International Patent Application No. PCT/JP2018/004833.
(Continued)

*Primary Examiner* — Christopher P Schwartz
(74) *Attorney, Agent, or Firm* — Kenja IP Law PC

(57) ABSTRACT

An active anti-vibration device 10 includes a pair of elastic connecting parts 20 and 30, a rod body 40 that connects the pair of elastic connecting parts, an inertial mass 52 that is supported by the rod body, a drive part 58 that reciprocates the inertial mass in an axial direction of the rod body, and a controller 90 that is configured to be able to perform acceleration feedback control to control the drive part so that a first force proportional to an axial acceleration of the rod body is generated.

6 Claims, 7 Drawing Sheets

ENGINE
C
41
10
20
23
22
43
40
44
55
52
90
80
53
CONTROLLER
56
54
58
54
50
55
100
51
AMPLIFIER
53
57
32
33
30
42
VEHICLE BODY

(52) U.S. Cl.
CPC ........ *F16F 15/022* (2013.01); *F16F 2222/08* (2013.01); *F16F 2228/066* (2013.01); *F16F 2230/0047* (2013.01); *F16F 2230/08* (2013.01); *F16F 2230/18* (2013.01)

(58) Field of Classification Search
USPC ............ 248/550, 610, 636, 638; 267/140.11, 267/140.14, 140.15, 141.2
See application file for complete search history.

(56) References Cited

U.S. PATENT DOCUMENTS

| | | | | |
|---|---|---|---|---|
| 8,827,250 | B2 * | 9/2014 | Satou | F16F 7/1011 267/140.14 |
| 9,308,806 | B2 * | 4/2016 | Inoue | B60K 5/1283 |
| 9,689,457 | B2 * | 6/2017 | Kojima | F16F 1/3849 |
| 2012/0098177 | A1 * | 4/2012 | Satou | F16F 7/1011 267/140.14 |
| 2012/0193846 | A1 * | 8/2012 | Kashani | F16F 15/0275 267/140.14 |
| 2013/0328254 | A1 | 12/2013 | Kojima et al. | |
| 2014/0124645 | A1 * | 5/2014 | Satou | F16F 15/02 248/638 |
| 2015/0001773 | A1 | 1/2015 | Inoue | |
| 2016/0053848 | A1 * | 2/2016 | Nakamura | F16F 1/3863 248/634 |
| 2017/0292444 | A1 | 10/2017 | Kondo et al. | |

FOREIGN PATENT DOCUMENTS

| | | | | | |
|---|---|---|---|---|---|
| CN | 104136799 | A | | 11/2014 | |
| JP | H05286332 | A | | 11/1993 | |
| JP | 2013184572 | A | | 9/2013 | |
| JP | 2015169242 | A | | 9/2015 | |
| JP | 2016075380 | A | * | 5/2016 | F16F 15/02 |
| JP | 2016075380 | A | | 5/2016 | |
| WO | 2016051461 | A1 | | 4/2016 | |

OTHER PUBLICATIONS

Nov. 26, 2019, International Preliminary Report on Patentability issued in the International Patent Application No. PCT/JP2018/004833.

Oct. 10, 2020, Search result of Office Action issued by the China National Intellectual Property Administration in the corresponding Chinese Patent Application No. 201880034006.7.

Feb. 5, 2021, Search result of the Extended European Search Report issued by the European Patent Office in the corresponding European Patent Application No. 18806340.8.

May 17, 2021, Search result of Office Action issued by the China National Intellectual Property Administration in the corresponding Chinese Patent Application No. 201880034006.7.

* cited by examiner

ENGINE
C
41
10
20
23
22
43
40
44
55
52
90
80
53
CONTROLLER
SN
SN
56
NS
NS
54
54
58
100
50
55
AMPLIFIER
51
53
57
32
33
30
42
VEHICLE BODY

COMPARATIVE EXAMPLE 2:
WITHOUT AFB, WITH VFB
(Ga=0, Gv=Gv0>0)
EXAMPLE 2:
WITH AFB, WITH VFB
(Ga=Ga0>0, Gv=Gv0>0)
FREQUENCY (Hz)
VIBRATION TRANSMISSIBILITY Tr (=|x2/x1|)
0
100
200
300
400
500
600
700
800
0.2
0.18
0.16
0.14
0.12
0.1
0.08
0.06
0.04
0.02
0

ACTIVE ANTI-VIBRATION DEVICE AND METHOD OF CONTROLLING ACTIVE-VIBRATION DEVICE

TECHNICAL FIELD

The present disclosure relates to an anti-vibration device and a method of controlling the active-vibration device.

The present application claims priority based on Japanese Patent Application No. 2017-102164, filed May 23, 2017, the entire contents of which are incorporated herein by reference.

BACKGROUND

As a conventional active anti-vibration device, there is a device that performs velocity feedback control that controls a drive part so that a force proportional to an axial velocity of a rod body is generated (for example, see PTL 1).

CITATION LIST

Patent Literature

PTL 1: Japanese Patent Laid-Open No. 2016-75380

SUMMARY

Technical Problem

In the above-described conventional active anti-vibration device, the anti-vibration performance and the resonance frequency are mainly determined by a mass of a rod body.

When the resonance frequency is high, the anti-vibration frequency region on the higher side than the resonance frequency becomes narrow. Therefore, it is necessary to increase the mass of the rod body to reduce the resonance frequency to enlarge the anti-vibration frequency region on the higher side than the resonance frequency. However, this may cause the fuel efficiency of the vehicle to be deteriorated by an amount equivalent to increase in the mass of the rod body. Accordingly, it can be said that an anti-vibration performance equivalent to that in the case where the mass of the rod body is increased is preferably obtained without actually increasing the mass of the rod body.

Thus, there is desired a technique of achieving the anti-vibration performance equivalent to that in the case where the mass of the rod body differs from the actual mass.

The present disclosure has been made to solve the above-described problems, and an object of the present disclosure is to provide an active anti-vibration device capable of achieving an anti-vibration performance equivalent to that in a case where a mass of a rod body differs from an actual mass, and a method of controlling the active anti-vibration device.

Solution to Problem

An active anti-vibration device of the present disclosure includes a pair of elastic connecting parts, a rod body that connects the pair of elastic connecting parts, an inertial mass that is supported by the rod body, a drive part that reciprocates the inertial mass in an axial direction of the rod body, and a controller that is configured to be able to perform acceleration feedback control to control the drive part so that a first force proportional to an axial acceleration of the rod body is generated.

In a method of controlling an active anti-vibration device of the present disclosure, the active anti-vibration device comprising a pair of elastic connecting parts, a rod body that connects the pair of elastic connecting parts, an inertial mass that is supported by the rod body, a drive part that reciprocates the inertial mass in an axial direction of the rod body, and a controller that controls the drive part, the controller performs acceleration feedback control by controlling the drive part so that a first force proportional to an axial acceleration of the rod body is generated.

Advantageous Effect

According to the present disclosure, there can be provided an active anti-vibration device capable of achieving an anti-vibration performance equivalent to that in a case where a mass of a rod body differs from an actual mass, and a method of controlling the active anti-vibration device.

DETAILED DESCRIPTION

The following illustrates and describes an embodiment of an active anti-vibration device according to the present disclosure and a method of controlling the active anti-vibration device with reference to the drawings.

[Overall Configuration of Active Anti-Vibration Device]

Firstly, an overall configuration of an active anti-vibration device 10 according to one embodiment of the present disclosure will be described with reference to FIG. 1 to FIG. 3.

Figure 1:
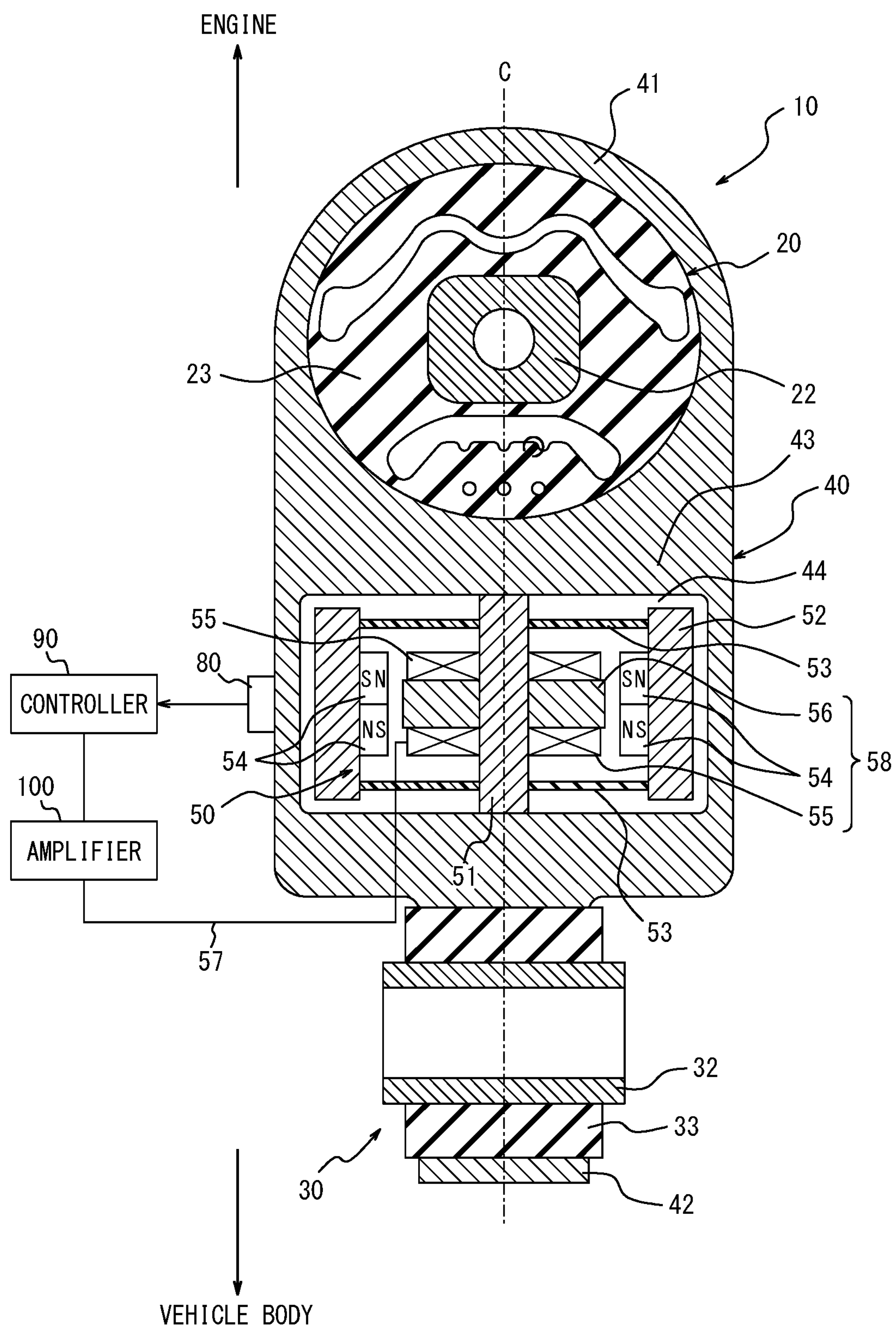
FIG. 1 is a cross sectional view illustrating an active anti-vibration device according to one embodiment of the present disclosure.

FIG. 1 is a cross-sectional view illustrating an active anti-vibration device 10 according to the present embodiment. FIG. 2 is a main portion cross-sectional view enlarging and illustrating a main portion of the active anti-vibration device of FIG. 1 in an operation state. The active anti-vibration device 10 of the present embodiment is structured as a torque rod, and is configured to connect an engine side and a vehicle body side of a vehicle. More specifically, the active anti-vibration device 10 in the illustrated example is suitable for use as an upper torque rod to be connected to the engine mounted to the vehicle body by means of a pendulum mount structure. Note that the active anti-vibration device of the present disclosure may be configured to be connected to the engine by means of a supporting structure other than the pendulum mount structure, or may be configured to be used as a torque rod other than the upper torque rod.

The active anti-vibration device 10 of the present embodiment includes a pair of elastic connecting parts 20 and 30, a rod body 40 connecting the pair of elastic connecting parts 20 and 30, an actuator 50 disposed in the rod body 40, an accelerometer 80 attached to the rod body 40, a controller 90, and an amplifier 100.

The rod body 40 integrally includes a first outer cylinder part 41 that accommodates the first elastic connecting part 20 of the pair of elastic connecting parts 20 and 30 at an inner circumferential side of the first outer cylinder part 41, a second outer cylinder part 42 that accommodates the second elastic connecting part 30 at an inner circumferential side of the second outer cylinder part 42, and a middle part 43 that extends straight between the first outer cylinder part 41 and the second outer cylinder part 42.

In this specification, an extending direction of a central axis C of the rod body 40 is referred to as an axial direction of the rod body 40 (also simply referred to as an "axial direction").

The rod body 40 is made of, for example, metal such as iron or aluminum, or resin.

The first elastic connecting part 20 and the second elastic connecting part 30 include respective inner cylinders 22 and 32 that are disposed at the inner circumferential sides of the first outer cylinder part 41 and the second outer cylinder part 42, respectively, and respective elastic members 23 and 33 that connect inner circumferential surfaces of the first outer cylinder part 41 and the second outer cylinder part 42 and outer circumferential surfaces of inner cylinders 22 and 32, respectively. The elastic members 23 and 33 are made of, for example, rubber.

In the example illustrated in FIG. 1, the first elastic connecting part 20 has an outer diameter larger than the second elastic connecting part 30.

In this example, the first elastic connecting part 20 is configured to be connected to the engine side of the vehicle, and the second elastic connecting part 30 is configured to be connected to the vehicle body side of the vehicle.

In the example illustrated in FIG. 1, the central axis of the inner cylinder 22 of the first elastic connecting part 20 and the central axis of the inner cylinder 32 of the second elastic connecting part 30 extend in mutually perpendicular directions, but the directional relation between these central axes is not limited thereto, and, for example, both may extend in parallel to each other.

The actuator 50 is disposed in a recess 44 formed in the rod body 40. The actuator 50 is formed as a linear movable actuator, and includes a shaft 51, an inertial mass 52, a connecting member 53, a permanent magnet 54, a coil 55, and a winding core 56. Among these, the permanent magnet 54, the coil 55 and the winding core 56 form a drive part 58 configured to drive the inertial mass 52 in the axial direction.

The shaft 51 extends in the axial direction of rod body 40 in the recess 44 of the rod body 40. Both ends of the shaft 51 in the axial direction are fixed to a pair of inner wall surfaces facing each other in the axial direction among the inner wall surfaces defining the recess 44 of the rod body 40. In the example illustrated in FIG. 1, the central axis of the shaft 51 coincides with the central axis of the rod body 40. Note that only one end of the shaft 51 in the axial direction may be fixed to the inner wall surface of the recess 44 of the rod body 40.

The inertial mass 52 is formed into a cylindrical shape coaxially with the shaft 51, and is connected to the shaft 51 through the connecting member 53 extending in a radial direction, to thereby be supported by the rod body 40. In the example illustrated in FIG. 1, ends of the inertial mass 52 on both sides in the axial direction are connected to the shaft 51 through the respective connecting members 53, but only the end of the inertial mass 52 on one side in the axial direction may be connected to the shaft 51 through the connecting member 53.

The connecting member 53 is comprised of an elastic member such as a plate spring.

A pair of permanent magnets 54 adjacent to each other in the axial direction are fixed on the inner circumferential surface of the inertial mass 52 in a state in which the permanent magnets 54 are reverse-polarized to each other.

The winding core 56 and the coil 55 wound around the winding core 56 are fixed to the outer circumferential surface of the shaft 51 to be spaced inward in the radial direction from the permanent magnets 54. One end of a lead wire 57 extending outside of the active anti-vibration device 10 is connected to the coil 55. The other end of the lead wire 57 is connected to the amplifier 100.

Although not illustrated in FIG. 1, the permanent magnets 54 may be fixed to the outer circumferential surface of the winding core 56.

In the actuator 50 configured as described above, when the voltage is applied to the coil 55 through the lead wire 57 from the amplifier 100, the winding core 56 and the coil 55 function as an electromagnet. As exaggerated in the enlarged cross-sectional view of FIG. 2, the inertial mass 52 is relatively displaced to either one side in the axial direction with respect to the shaft 51 based on a repulsive force generated between the same poles or an attractive force generated between the opposite poles, the repulsive force or the attractive force acting between the winding core 56 and the permanent magnet 54. In the example in FIG. 2, the inertial mass 52 is relatively displaced to the first elastic connecting part 20 side (an upper side of FIG. 2) with respect to the shaft 51. Then, a force Fa indicated by an arrow in FIG. 2 is generated in the active anti-vibration device 10 based on a restoring force of the elastic deformation of the connecting member 53 connecting the inertial mass 52 and the shaft 51. On the other hand, a force in a direction opposite to the force Fa indicated by an arrow in FIG. 2 is generated in the inertial mass 52, so that the inertial mass 52 returns to an original arrangement position illustrated in FIG. 1.

The direction of the current flowing through the coil 55 is reversed to relatively displace the inertial mass 52 to the other side in the axial direction with respect to the shaft 51.

The accelerometer 80 detects and outputs an axial acceleration of the rod body 40. In the example illustrated in FIG. 1, the accelerometer 80 is attached to an outer surface of the rod body 40, but may be attached to any position of the rod body 40. The acceleration detected by the accelerometer 80 is output to the controller 90 via wired communication or via wireless communication, as needed.

The controller 90 is configured to allow the axial force Fa to be generated in the rod body 40 while controlling the drive part 58 of the actuator 50 based on an axial acceleration of the rod body 40, the acceleration being detected by the accelerometer 80. As described later, the controller 90 is configured to be able to perform at least acceleration feedback control. A signal output from the controller 90 is input to the amplifier 100.

The controller 90 is comprised of a computer having an arithmetic unit such as a CPU and a storage unit such as a ROM and a RAM, for example, and operates according to a program pre-stored in a storage device.

The amplifier 100 amplifies a signal input from the controller 90, and applies the amplified signal to the coil 55 of the actuator 50 to control the voltage. The amplifier 100 is comprised of, for example, an operational amplifier.

In the active anti-vibration device 10 configured as described above, the vibration input from the engine side is attenuated mainly by the vibration of the rod body 40 serving as a mass.

On the other hand, generally stated, the actuator 50 serves to reinforce a drawback of the rod body 40 by the electric control. More specifically, the actuator 50 is configured to be able to improve the anti-vibration performance by actively controlling a value of a rod resonance frequency (hereinafter also simply referred to as a "resonance frequency") of the active anti-vibration device 10 and a vibration transmissibility near the resonance frequency.

Note that the rod resonance frequency of the active anti-vibration device 10 is mainly determined by the mass of the rod body 40 and the characteristics of the elastic members 23 and 33 while no actuator 50 is operating.

Figure 3:
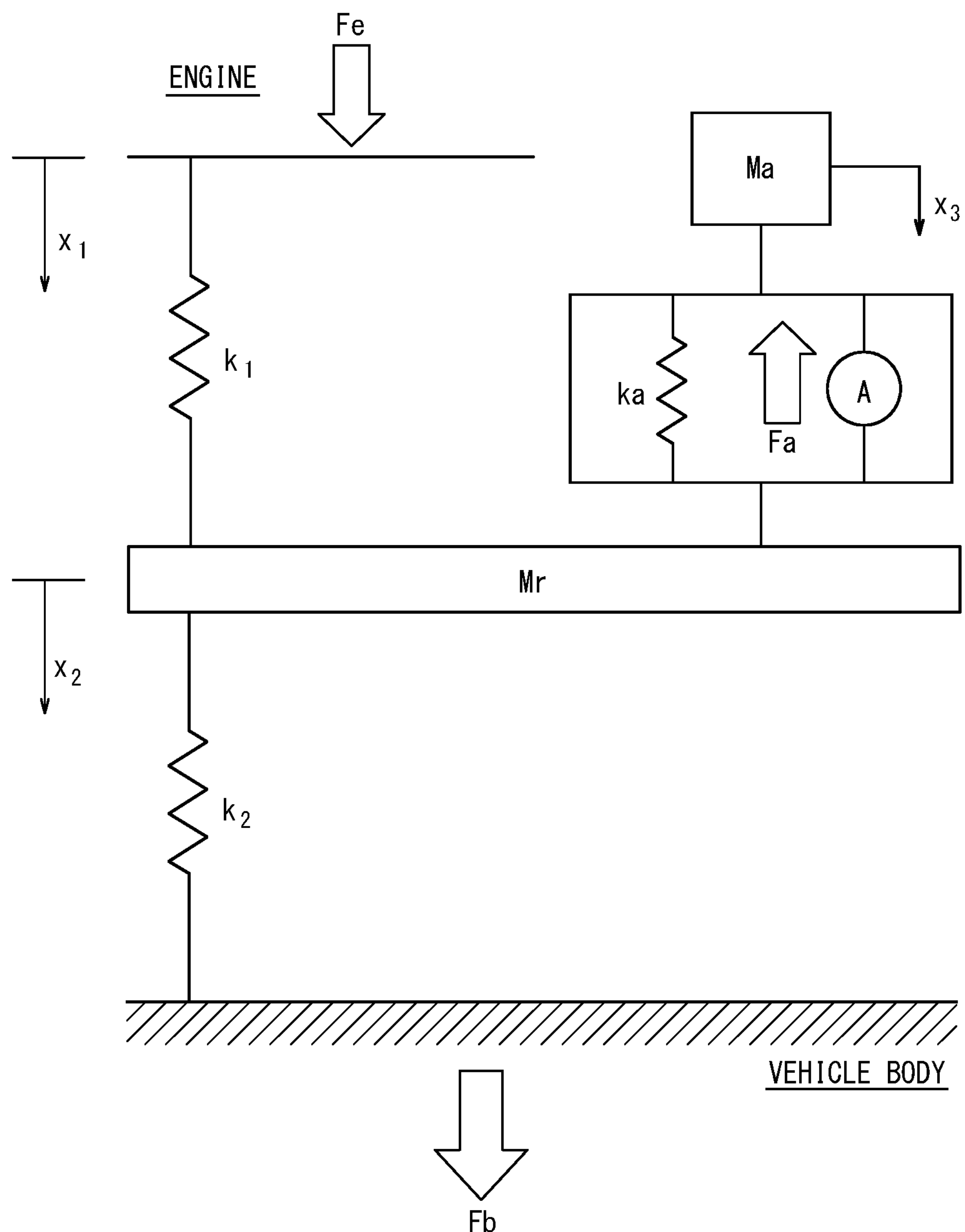
FIG. 3 is a diagram schematically illustrating a physical model of the active anti-vibration device of FIG. 1.

FIG. 3 schematically illustrates a physical model of the active anti-vibration device 10 of FIG. 1. In FIG. 3, reference signs "$k_1$" and "$k_2$" represent spring constants of the elastic member 23 and the elastic member 33, respectively, reference sign "Mr" represents a mass of the rod body 40, reference sign "Ma" represents a mass of the inertial mass 52 of the actuator 50, and reference sign "ka" represents a spring constant of the connecting member 53. Reference sign "A" represents the drive part 58. Reference sign "Fe" represents a force to be input to the active anti-vibration device 10 from the engine side, reference sign "Fb" represents a force to be input to the vehicle body side from the active anti-vibration device 10, and reference sign "Fa" represents a force generated by the actuator 50. Reference sign "$x_1$" represents an axial displacement of the inner cylinder 22 of the first elastic connecting part 20, reference sign "$x_2$" represents an axial displacement of the rod body 40, and reference sign "$x_3$" represents an axial displacement of the inertial mass 52.

Note that in the example illustrated in FIG. 1, the accelerometer 80 detects the acceleration corresponding to a value obtained by differentiating $x_2$ of FIG. 3 twice.

[Method of Controlling Active Anti-Vibration Device]

Next, a method of controlling the active anti-vibration device 10 of the present embodiment described above will be described.

The controller 90 of the active anti-vibration device 10 of the present embodiment is configured to be able to perform at least the acceleration feedback control.

The controller 90 may always perform the acceleration feedback control or may perform the acceleration feedback control at an arbitrary timing such as only while satisfying a predetermined condition, for example.

The controller 90 may be configured to be able to further perform velocity feedback control in addition to the acceleration feedback control. The controller 90 may always perform the velocity feedback control or may perform the velocity feedback control at an arbitrary timing such as only while satisfying a predetermined condition, for example.

It is preferable that the controller 90 performs the acceleration feedback control and the velocity feedback control at the same time.

Hereinafter, the acceleration feedback control and the velocity feedback control will be described in turn. Note that in the following description, reference signs that differ from those illustrated in the physical model of FIG. 3 are used for the sake of simplicity.

<Acceleration Feedback Control>

In the acceleration feedback control, the controller 90 controls the drive part 58 so that a first force Fa1 proportional to the axial acceleration of the rod body 40 is generated in the rod body 40.

The first force Fa1 can be represented by the following equation (1), for example.

[Expression 1]

$$Fa1=-Ga\cdot\ddot{x} \tag{1}$$

In the equation (1), "Ga" represents an acceleration feedback gain (positive number), and "$d^2x/dt^2$" (twice differential for x) represents an axial acceleration of the rod body 40.

A direction of the first force Fa1 represented by the equation (1) is opposite to the direction of the axial acceleration $d^2x/dt^2$ of the rod body 40.

In the present example, the controller 90 uses the acceleration output from the accelerometer 80 as a value of $d^2x/dt^2$. Note that the axial acceleration $d^2x/dt^2$ of the rod body 40 may be obtained by the other method.

The controller 90 determines a value of the acceleration feedback gain Ga. The acceleration feedback gain Ga may be constant during the acceleration feedback control or may be changed when a predetermined condition is satisfied, for example.

The amplifier 100 increases the voltage according to the determined acceleration feedback gain Ga, and applies the voltage to the coil 55 of the drive part 58 so that the first force Fa1 is generated.

Here, the effect of the acceleration feedback control will be described.

Firstly, a motion equation of the active anti-vibration device 10 is schematically defined by the following equation (2).

[Expression 2]

$$m\ddot{x}+c\dot{x}+kx=Fe+Fa1 \tag{2}$$

In the equation (2), reference sign "m" represents a mass (mainly including the mass of the rod body), reference sign "c" represents an attenuation coefficient, reference sign "k" represents a spring constant (a combined spring constant of $k_1$ and $k_2$), reference sign "x" represents an axial displacement of the rod body 40, reference sign "Fe" represents a force to be input from the engine side to the active anti-vibration device 10, and reference sign "Fa1" represents a first force generated by the actuator 50.

By substituting the equation (1) into the equation (2), the following equation is obtained.

[Expression 3]

$$(m+Ga)\ddot{x}+c\dot{x}+kx=Fe \tag{3}$$

In this way, in the acceleration feedback control of this example, as represented by the equation (1), the first force Fa1 proportional to the axial acceleration $d^2x/dt^2$ of the rod body 40 is generated in the direction opposite to the direction of the axial acceleration $d^2x/dt^2$ of the rod body 40. Accordingly, a coefficient of an acceleration term in the motion equation represented by the equation (3) is increased from m to m+Ga. This means that the active anti-vibration device 10 can be operated as if the mass of the rod body 40 was larger than the actual mass (that is, as if the mass of the rod body 40 was virtually increased). Therefore, an effect (anti-vibration performance) equivalent to that in the case where the mass of the rod body 40 is increased relative to the actual mass can be obtained. When the virtual mass of the rod body 40 is thus operated, the rod resonance frequency can be operated (can be reduced in the present example).

Here, in a conventional typical torque rod, the rod body is made of relatively light-weight material such as aluminum or resin, and the resonance frequency is about 600 to 800 Hz. However, since the needs for attenuation of the vibration are increased at a lower frequency, in the recent active anti-vibration device, the rod body is made of a heavy material such as a casting made of iron in some cases, so that the resonance frequency is as low as about 200 Hz, the anti-vibration frequency region having a frequency of √2 (the square root of 2) times or more higher than the resonance frequency is enlarged, and the vibration transmissibility near the resonance frequency is reduced by the velocity feedback control. However, this may cause the fuel efficiency to be deteriorated by an amount equivalent to increase in the mass of the rod body.

Meanwhile, according to the acceleration feedback control of this example, the resonance frequency can be reduced without actually increasing the mass of the rod body 40, and the anti-vibration frequency region on the higher side than the resonance frequency, more specifically, the anti-vibration frequency region having a frequency of √2 (the square root of 2) times or more higher than the resonance frequency can be enlarged. Since the mass of the rod body 40 need not be increased, the deterioration in fuel efficiency can be suppressed.

According to the acceleration feedback control of this example, the mass of the rod body 40 can be also reduced without changing the resonance frequency. This enables the fuel efficiency to be improved while maintaining the anti-vibration performance.

According to the acceleration feedback control of this example, the vibration transmissibility near the resonance frequency can be reduced without performing the velocity feedback control.

Note that, in the acceleration feedback control, a first force Fa1 represented by the following equation (4) instead of the equation (1) may be used as the first force Fa1.

[Expression 4]

$$Fa1=Ga\cdot\ddot{x} \qquad (4)$$

A direction of the first force Fa1 represented by the equation (4) is the same as the direction of the axial acceleration $d^2x/dt^2$ of the rod body 40.

By substituting the equation (4) into the equation (2), the following equation is obtained.

[Expression 5]

$$(m-Ga)\ddot{x}+c\dot{x}+kx=Fe \qquad (5)$$

In this way, in the acceleration feedback control of this example, as represented by the equation (4), the first force Fa1 proportional to the axial acceleration $d^2x/dt^2$ of the rod body 40 is generated in the direction the same as the direction of the axial acceleration $d^2x/dt^2$ of the rod body 40. Accordingly, a coefficient of an acceleration term in the motion equation represented by the equation (5) is reduced from m to m-Ga. This means that the active anti-vibration device 10 can be operated as if the mass of the rod body 40 was smaller than the actual mass (that is, as if the mass of the rod body 40 was virtually reduced). Therefore, an effect (anti-vibration performance) equivalent to that in the case where the mass of the rod body 40 is reduced relative to the actual mass can be obtained. This enables the resonance frequency to be increased without actually reducing the mass of the rod body 40.

As described above, according to the present embodiment, by performing the acceleration feedback control, the anti-vibration performance equivalent to that in the case where the mass of the rod body differs from the actual mass can be achieved. By thus operating the virtual mass of the rod body 40, the resonance frequency can be operated.

<Acceleration Feedback Control+Velocity Feedback Control>

As described above, the controller 90 may be configured to be able to perform the velocity feedback control in addition to the acceleration feedback control.

In the velocity feedback control, the controller 90 controls the drive part 58 so that a second force Fa2 proportional to an axial velocity of the rod body 40 is generated in the rod body 40.

The second force Fa2 can be represented by the following equation (6), for example.

[Expression 6]

$$Fa\ 2=-Gv\cdot\dot{x} \qquad (6)$$

In the equation (6), reference sign "Gv" represents a velocity feedback gain (positive number), and reference sign "dx/dt" (once differential for x) represents an axial velocity of the rod body 40.

A direction of the second force Fa2 represented by the equation (6) is opposite to the direction of the axial velocity dx/dt of the rod body 40.

In the present example, the controller 90 uses, as a value of dx/dt, the velocity obtained by integrating the acceleration output from the accelerometer 80 once. Accordingly, one sensor (accelerometer) can be used for both of the acceleration feedback control and the velocity feedback control, whereby an increase in size and an increase in cost can be suppressed. Note that the axial velocity dx/dt of the rod body 40 may be obtained by the other method.

The controller 90 determines a value of the velocity feedback gain Gv. The velocity feedback gain Gv may be constant during the velocity feedback control or may be changed when a predetermined condition is satisfied, for example.

The amplifier 100 increases the voltage according to the velocity feedback gain Gv determined by the controller 90, and applies the voltage to the coil 55 of the drive part 58 so that the second force Fa2 is generated.

Note that, when the acceleration feedback control and the velocity feedback control are performed at the same time, the amplifier 100 controls the voltage of the drive part 58 so that a force obtained by adding the first force Fa1 and the second force Fa2 is generated in the rod body 40.

Here, the effect when the velocity feedback control is performed in addition to the acceleration feedback control will be described.

Firstly, a motion equation of the active anti-vibration device 10 is schematically defined by the following equation (7).

[Expression 7]

$$m\ddot{x}+c\dot{x}+kx=Fe+Fa1+Fa2 \qquad (7)$$

In the equation (7), reference sign "m" represents a mass (mainly including the mass of the rod body), reference sign "c" represents an attenuation coefficient, reference sign "k" represents a spring constant (a combined spring constant of k1 and k2), reference sign "x" represents an axial displacement of the rod body 40, reference sign "Fe" represents a force to be input from the engine side to the active anti-vibration device 10, and reference signs "Fa1" and "Fa2" represent a first force and a second force generated by the actuator 50, respectively.

By substituting the equation (1) and the equation (6) into the equation (7), the following equation is obtained.

[Expression 8]

$$(m+Ga)\ddot{x}+(c+Gv)\dot{x}+kx=Fe \quad (8)$$

In this way, in the velocity feedback control of this example, as represented by the equation (6), the second force Fa2 proportional to the axial velocity dx/dt of the rod body 40 is generated in the direction opposite to the direction of the axial velocity dx/dt of the rod body 40. Accordingly, a coefficient of a velocity term (attenuation term) in the motion equation represented by the equation (8) is increased from c to c+Gv. This enables a reduction in the vibration transmissibility, in particular, a significant reduction of high vibration transmissibility near the resonance frequency.

Also in this example, the above-described effect of the acceleration feedback control can be obtained using the equations (1) to (3). Note that a first force Fa1 represented by the following equation (4) may be used as the first force Fa1.

EXAMPLES, COMPARATIVE EXAMPLES

Here, examples and comparative examples of an active anti-vibration device of the present disclosure will be described with reference to FIG. 4 to FIG. 7.

Examples 1 and 2 and Comparative Examples 1 and 2

Figure 4:
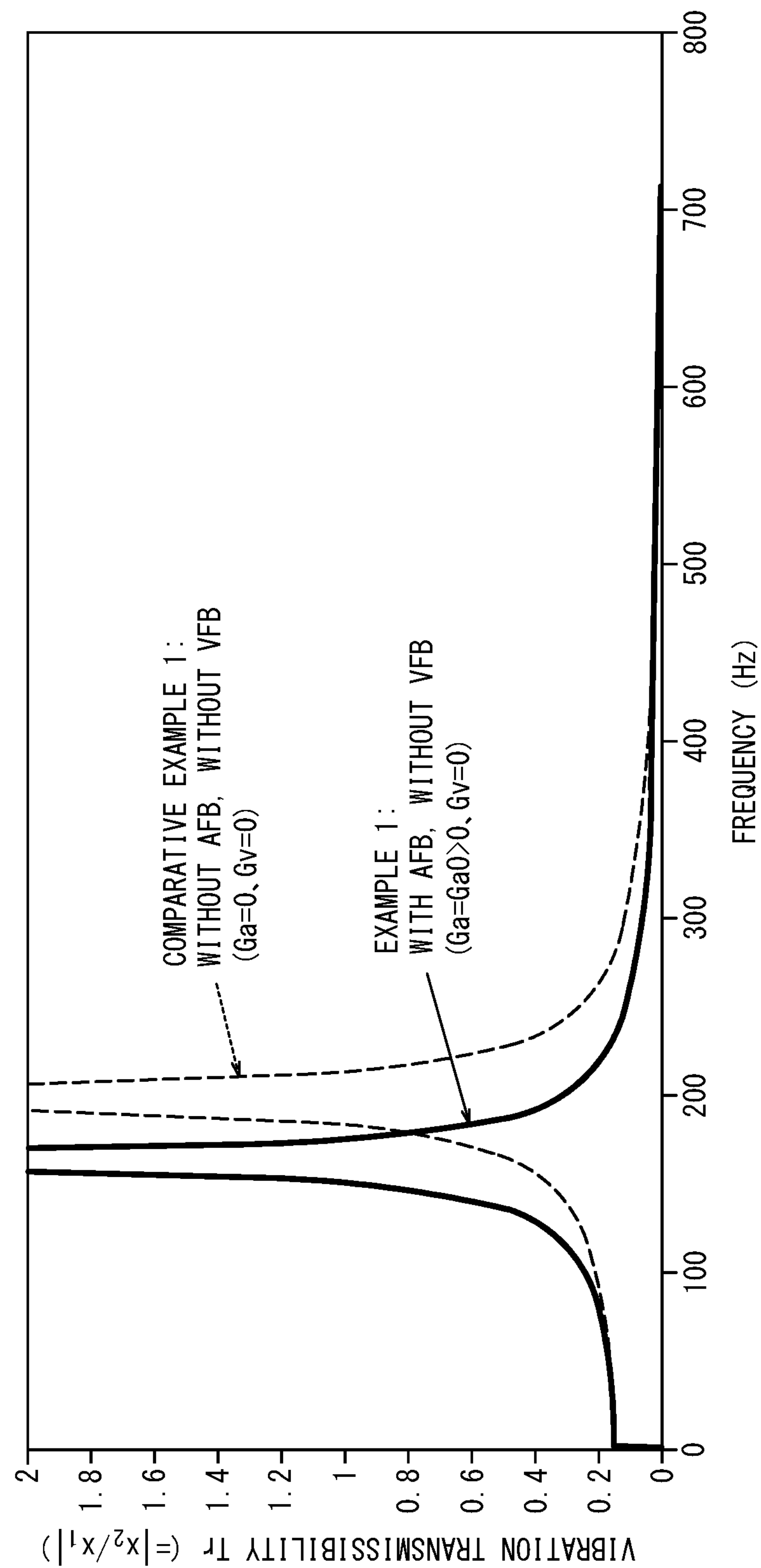
FIG. 4 is a graph presenting simulation results of Example 1 and Comparative Example 1 of an active anti-vibration device of the present disclosure.
Figure 5:
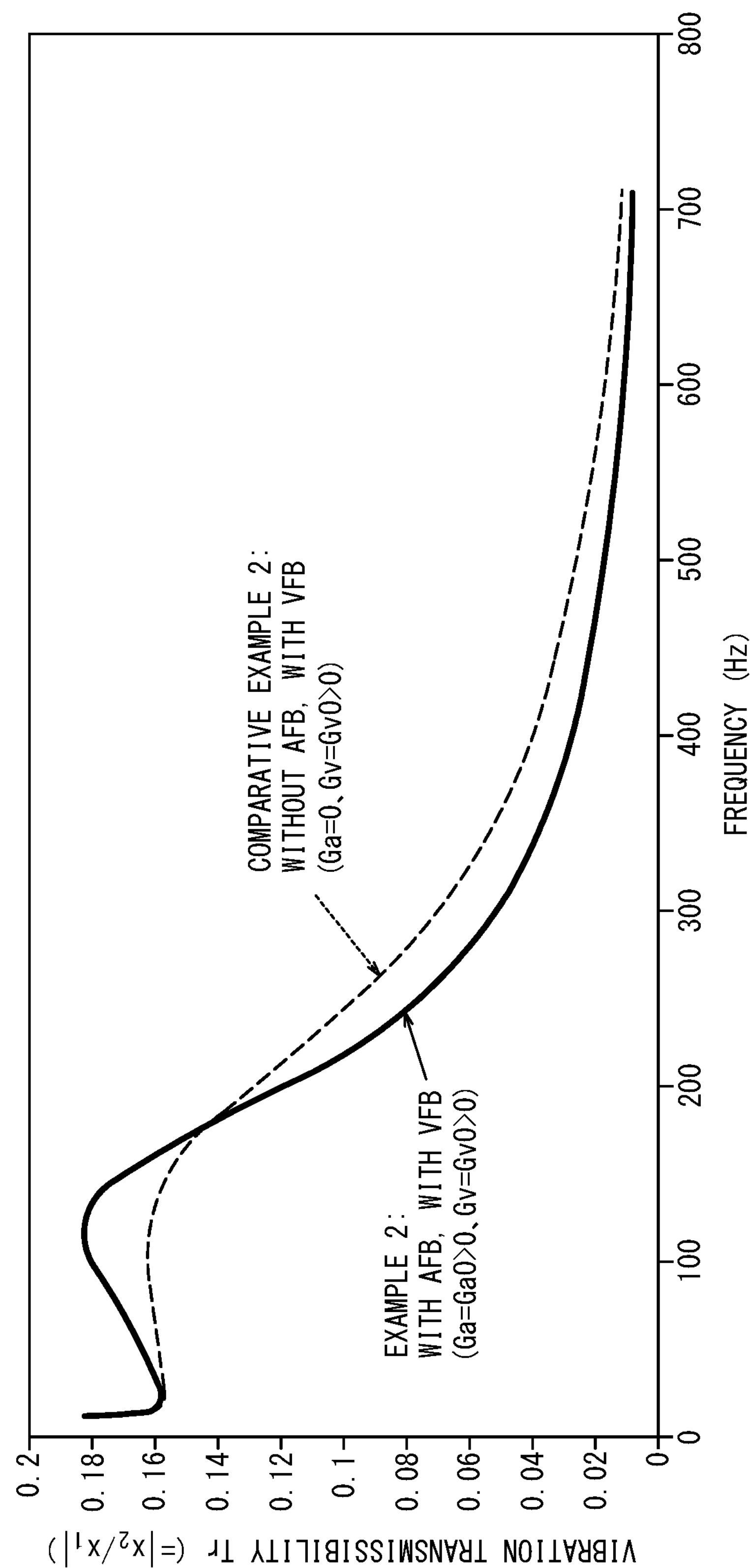
FIG. 5 is a graph presenting simulation results of Example 2 and Comparative Example 2 of the active anti-vibration device of the present disclosure.

FIG. 4 and FIG. 5 illustrate simulation results in Examples 1 and 2 and Comparative Examples 1 and 2 of the active anti-vibration device of the present disclosure.

Figure 2:
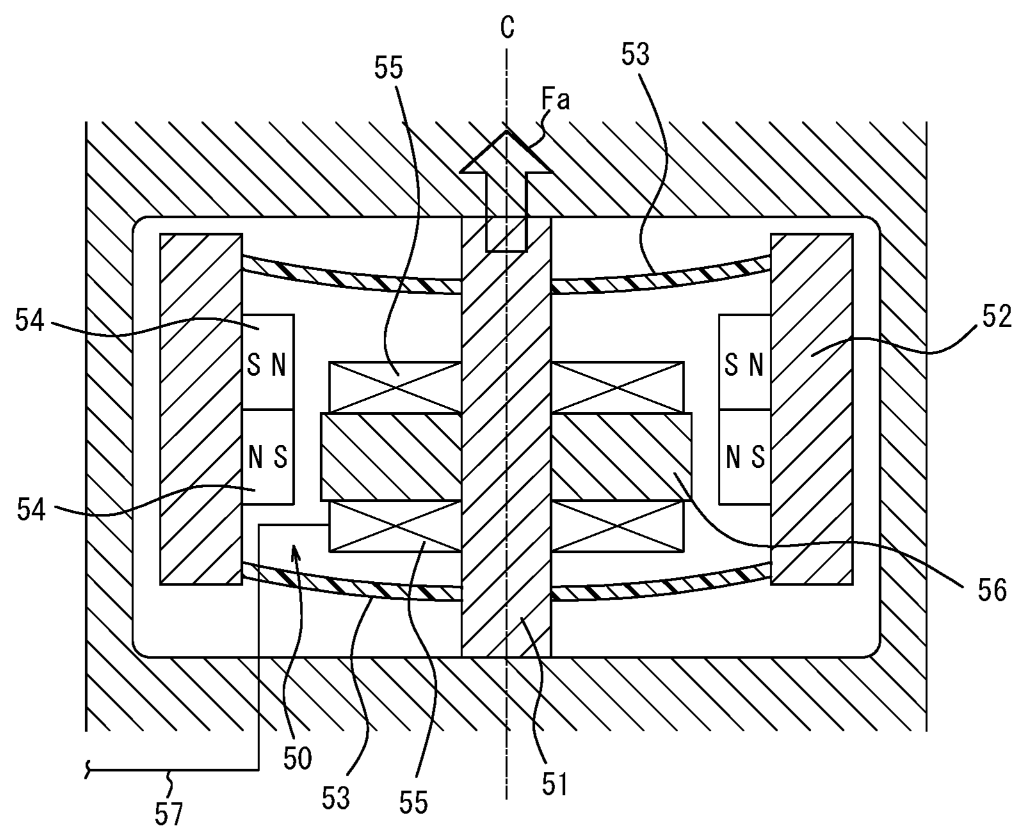
FIG. 2 is a main portion cross-sectional view enlarging and illustrating a main portion of the active anti-vibration device of FIG. 1 in an operation state.

Examples 1 and 2 and Comparative Examples 1 and 2 each have a configuration of the active anti-vibration device 10 in the example of FIG. 1 to FIG. 3. Examples 1 and 2 and Comparative Examples 1 and 2 are identical in various configurations such as the dimensions and the mass, and are only different in the control method using the actuator 50. In FIG. 4 and FIG. 5, the acceleration feedback control is abbreviated as "AFB" and the velocity feedback control is abbreviated as "VFB" for the sake of simplicity. The first force Fa1 represented by the above-described equation (1) was used as the first force Fa1 in the acceleration feedback control, and the second force Fa2 represented by the above-described equation (6) was used as the second force Fa2 in the velocity feedback control. The details of the gains Ga and Gv are presented in FIG. 4 and FIG. 5.

In FIG. 4 and FIG. 5, the horizontal axis represents a frequency (Hz), and the vertical axis represents a vibration transmissibility Tr. The vibration transmissibility Tr is represented by $Tr=|x_2/x_1|$. As illustrated in FIG. 3, $x_1$ denotes an axial displacement of the inner cylinder 22 of the first elastic connecting part 20, and $x_2$ denotes an axial displacement of the rod body 40.

In FIG. 4, the resonance frequency in Example 1 in which only the acceleration feedback control was performed is smaller than that in Comparative Example 1 in which both of the acceleration feedback control and the velocity feedback control were not performed. That is, in Example 1, an effect equivalent to that in the case where the mass of the rod body 40 is increased can be obtained, as compared with Comparative Example 1.

In FIG. 5, the vibration transmissibility Tr (peak value) at the resonance frequency in Example 2 and Comparative Example 2 in which the velocity feedback control was performed is smaller than that in Example 1 and Comparative Example 1 (FIG. 4) in which no velocity feedback control was performed. Furthermore, the vibration transmissibility in a band of not lower than 170 Hz in Example 2 in which both of the acceleration feedback control and the velocity feedback control were performed is lower than that in Comparative Example 2 in which only the velocity feedback control was performed. In Example 2, an effect equivalent to that in the case where the mass of the rod body 40 is increased can be obtained, as compared with Comparative Example 2.

Examples 3 to 10 and Comparative Examples 3 to 5

Figure 6:
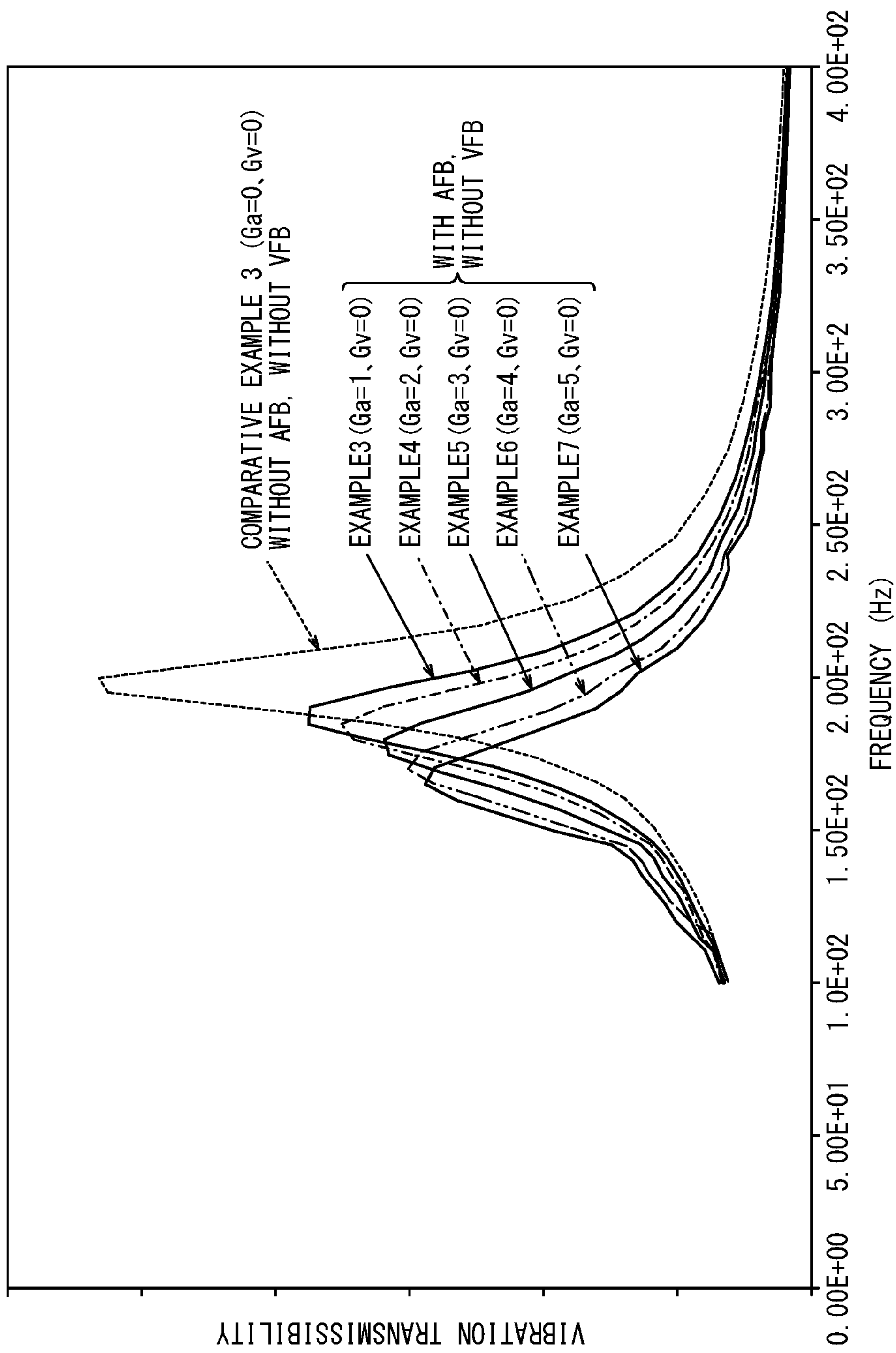
FIG. 6 is a graph presenting experimental results of Examples 3 to 7 and Comparative Example 3 of the active anti-vibration device of the present disclosure.
Figure 7:
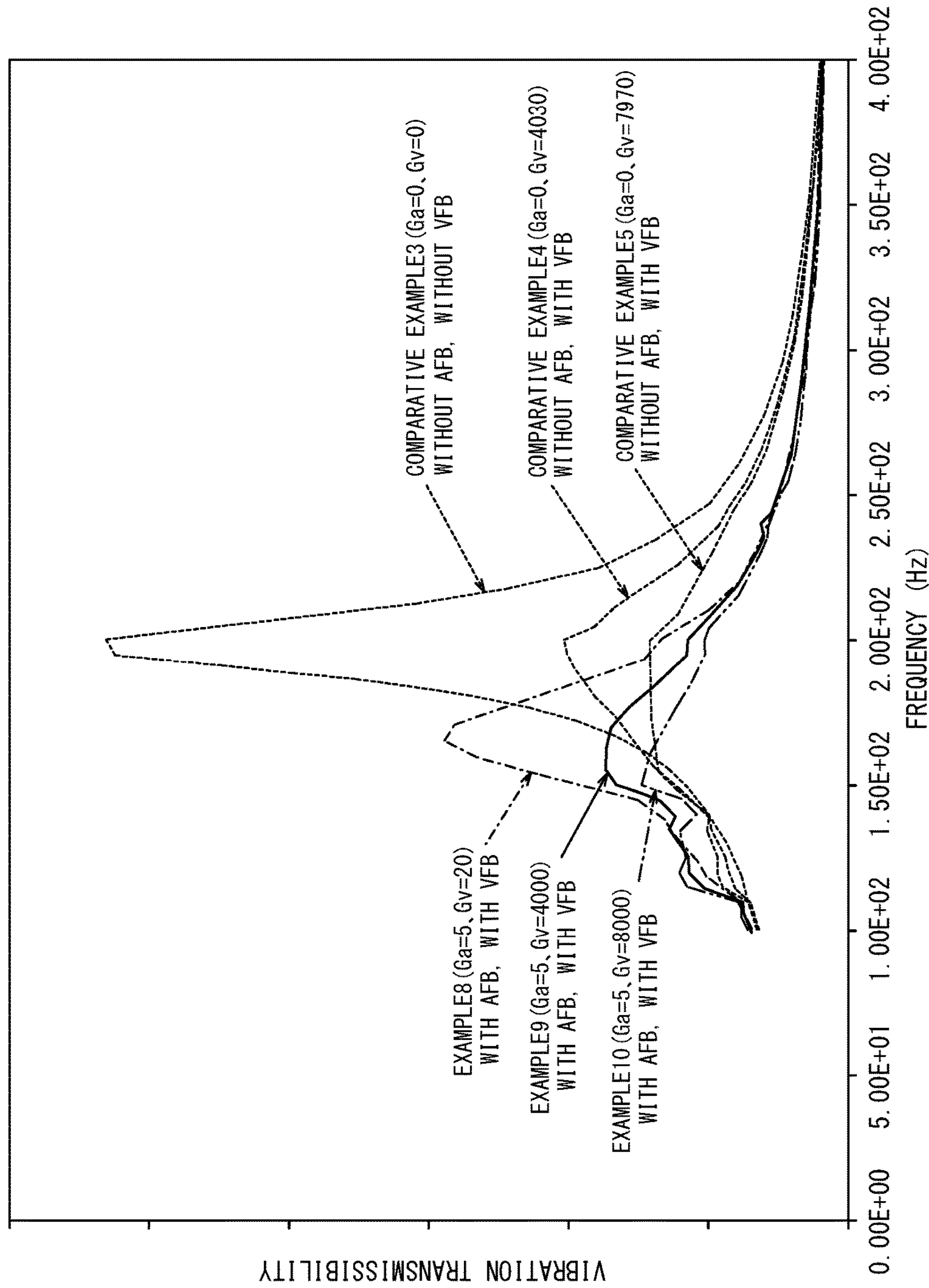
FIG. 7 is a graph presenting experimental results of Examples 8 to 10 and Comparative Examples 3 to 5 of the active anti-vibration device of the present disclosure.

FIG. 6 and FIG. 7 illustrate experimental results in Examples 3 to 10 and Comparative Examples 3 to 5 of the active anti-vibration device of the present disclosure.

Examples 3 to 10 and Comparative Examples 3 to 5 each have a configuration of the active anti-vibration device 10 in the example of FIG. 1 to FIG. 3. Examples 3 to 10 and Comparative Examples 3 to 5 are identical in various configurations such as the dimensions and the mass, and are only different in the control method using the actuator 50. In FIG. 6 and FIG. 7, the acceleration feedback control is abbreviated as "AFB" and the velocity feedback control is abbreviated as "VFB" for the sake of simplicity. The first force Fa1 represented by the above-described equation (1) was used as the first force Fa1 in the acceleration feedback control, and the second force Fa2 represented by the above-described equation (6) was used as the second force Fa2 in the velocity feedback control. The details of the gains Ga and Gv are presented in FIG. 6 and FIG. 7. Note that numerical values of the gains Ga and Gv presented in FIG. 6 and FIG. 7 are obtained by converting actual values into relative representative values.

In FIG. 6 and FIG. 7, the horizontal axis represents a frequency (Hz), and the vertical axis represents a vibration transmissibility. The value of the vibration transmissibility on the vertical axis becomes larger toward the upside of the figure.

In FIG. 6, the resonance frequency in Examples 3 to 7 in which only the acceleration feedback control was performed is smaller than that in Comparative Example 3 in which both of the acceleration feedback control and the velocity feedback control were not performed. Furthermore, the vibration transmissibility (peak value) at the resonance frequency in Examples 3 to 7 in which the acceleration feedback control was performed is smaller than that in Comparative Example 3 in which acceleration feedback control was not performed.

In FIG. 6, comparison among Examples 3 to 7 in which only the acceleration feedback control was performed reveals that a larger acceleration feedback gain Ga indicates a lower resonance frequency. Comparison among Examples 3 to 7 reveals that a larger acceleration feedback gain Ga indicates a lower vibration transmissibility (peak value) at the resonance frequency.

In FIG. 7, comparison among Comparative Examples 3 to 5 reveals that the resonance frequency is almost the same, but the larger velocity feedback gain Gv indicates a lower vibration transmissibility (peak value) at the resonance frequency.

In FIG. 7, the resonance frequency in Examples 8 to 10 in which both of the acceleration feedback control and the velocity feedback control were performed is smaller than that in Comparative Examples 3 to 5 in which acceleration feedback control was not performed. Comparison among Examples 8 to 10 reveals that the larger velocity feedback gain Gv indicates a lower vibration transmissibility (peak value) at the resonance frequency. Comparison between Comparative Example 4 and Comparative Example 9 reveals that the velocity feedback gain Gv in Example 9 in which the acceleration feedback control was performed is slightly smaller than that in Comparative Example 4 in which the acceleration feedback control was not performed, but the vibration transmissibility at the resonance frequency in Example 9 is lower than that in Comparative Example 4.

Variant Example

Note that the active anti-vibration device 10 and a method of controlling the same according to the present disclosure are not limited to the above-described examples, and various variant examples are possible.

For example, the controller 90 may perform the acceleration feedback control so that the vibration frequency of the engine connected to the active anti-vibration device 10 is away from the rod resonance frequency of the active anti-vibration device 10 by equal to or more than a predetermined frequency. In this case, the controller 90 preferably uses, for example, an engine speed signal from a vehicle, as an engine vibration frequency.

More specifically, the value of the acceleration feedback gain Ga is changed (for example, the sign is reversed) to change the rod resonance frequency, so that the vibration frequency of the engine is away from the rod resonance frequency by equal to or more than a predetermined frequency. This enables the vibration performance to be improved while reducing power consumption.

INDUSTRIAL APPLICABILITY

The active anti-vibration device and the method of controlling the same according to the present disclosure can be used for a torque rod configured to connect an engine side and a vehicle body side of a vehicle, for example.

REFERENCE SIGNS LIST

10 Active anti-vibration device
20 First elastic connecting part (elastic connecting part)
22 Inner cylinder
23 Elastic member
30 Second elastic connecting part (elastic connecting part)
32 Inner cylinder
33 Elastic member
40 Rod body
41 First outer cylinder part
42 Second outer cylinder part
43 Middle part
44 Recess
50 Actuator
51 Shaft
52 Inertial mass
53 Connecting member
54 Permanent magnet
55 Coil
56 Winding core
57 Lead wire
58 Drive part
80 Accelerometer
90 Controller
100 Amplifier
C Central axis of rod body

The invention claimed is:

1. An active anti-vibration device, comprising:
a pair of elastic connecting parts;
a rod body that connects the pair of elastic connecting parts;
an inertial mass that is supported by the rod body;
a drive part that reciprocates the inertial mass in an axial direction of the rod body;
a controller that is configured to be able to perform acceleration feedback control to control the drive part so that a first force proportional to an axial acceleration of the rod body is generated, and
an accelerometer that is attached to the rod body and detects the axial acceleration of the rod body,
wherein one of the pair of elastic connecting parts is configured to be connected to an engine side of a vehicle,
the other of the pair of elastic connecting parts is configured to be connected to a vehicle body side of the vehicle,
the controller, in the acceleration feedback control, uses the acceleration detected by the accelerometer,
in the acceleration feedback control, the controller generates the first force in a direction opposite to a direction of the axial acceleration of the rod body,
the controller is configured to be able to further perform velocity feedback control to control the drive part so that a second force proportional to an axial velocity of the rod body is generated, and
the controller, in the velocity feedback control, uses a velocity obtained by integrating the acceleration detected by the accelerometer.

2. The active anti-vibration device according to claim 1, wherein
the controller performs the acceleration feedback control so that a vibration frequency of the engine is away from a rod resonance frequency of the active anti-vibration device by equal to or more than a predetermined frequency.

3. The active anti-vibration device according to claim 1, wherein
the controller performs the acceleration feedback control so that a vibration frequency of the engine is away from a rod resonance frequency of the active anti-vibration device by equal to or more than a predetermined frequency.

4. A method of controlling an active anti-vibration device, the active anti-vibration device comprising:
a pair of elastic connecting parts;
a rod body that connects the pair of elastic connecting parts;
an inertial mass that is supported by the rod body;
a drive part that reciprocates the inertial mass in an axial direction of the rod body;

a controller that controls the drive part; and an accelerometer that is attached to the rod body and detects the axial acceleration of the rod body, wherein one of the pair of elastic connecting parts is configured to be connected to an engine side of a vehicle, the other of the pair of elastic connecting parts is configured to be connected to a vehicle body side of the vehicle, the controller performs acceleration feedback control by controlling the drive part so that a first force proportional to an axial acceleration of the rod body is generated, the controller, in the acceleration feedback control, uses the acceleration detected by the accelerometer, in the acceleration feedback control, the controller generates the first force in a direction opposite to a direction of the axial acceleration of the rod body, the controller further performs velocity feedback control to control the drive part so that a second force proportional to an axial velocity of the rod body is generated, and the controller, in the velocity feedback control, uses a velocity obtained by integrating the acceleration detected by the accelerometer.

5. The method of controlling an active anti-vibration device according to claim 4, wherein in the active anti-vibration device, the controller performs the acceleration feedback control so that a vibration frequency of the engine is away from a rod resonance frequency of the active anti-vibration device by equal to or more than a predetermined frequency.

6. The method of controlling an active anti-vibration device according to claim 4, wherein in the active anti-vibration device, the controller performs the acceleration feedback control so that a vibration frequency of the engine is away from a rod resonance frequency of the active anti-vibration device by equal to or more than a predetermined frequency.

* * * * *